United States Patent [19]

Hwang

[11] Patent Number: 5,040,488

[45] Date of Patent: Aug. 20, 1991

[54] VEHICLE INTERIOR AQUARIUM

[76] Inventor: Haw C. Hwang, No. 3, Lane 21, Hsing Te Rd., Taipei, Taiwan

[21] Appl. No.: 518,418

[22] Filed: May 3, 1990

[51] Int. Cl.$^5$ .................. A01K 63/06; A01K 63/02
[52] U.S. Cl. ........................................................ 119/5
[58] Field of Search ............................................ 119/5, 3

[56] References Cited

U.S. PATENT DOCUMENTS

| 3,721,212 | 3/1973 | Groth | 119/5 |
| 4,019,460 | 4/1977 | Muller | 119/5 |

FOREIGN PATENT DOCUMENTS

| 2472339 | 7/1981 | France | 119/5 |
| 6786 | 6/1897 | Norway | 119/5 |
| 2193071 | 2/1988 | United Kingdom | 119/5 |

*Primary Examiner*—John G. Weiss

[57] ABSTRACT

A vehicle interior aquarium, which comprises a water tank for containing water to keep living water animals and water plants and being supported by a shock absorbing base and covered with a heat insulating top cover. A DC pump is attached to pump air into the water tank to generate air bubbles through bubble tubes. A rectangular projection is made on the top of the water tank for the fastening therein of a rectangular projection on the bottom of the top cover so as to protect from spraying of water out of the aquarium.

2 Claims, 4 Drawing Sheets

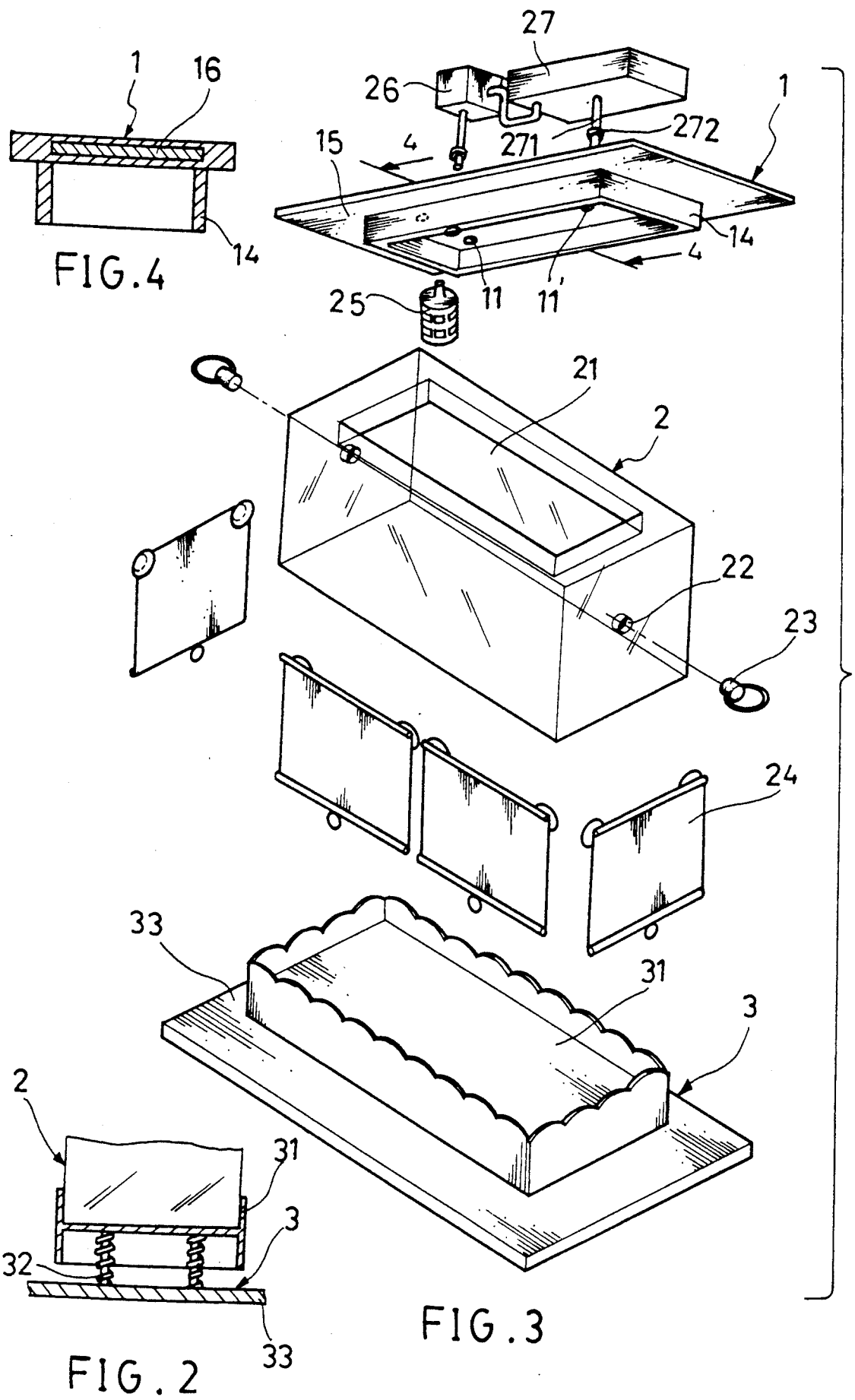

VEHICLE INTERIOR AQUARIUM

BACKGROUND OF THE INVENTION

The present invention is related to aquariums and more particularly to an aquarium for mounting inside a vehicle to keep living water animals and water plants.

Regular aquariums are generally installed indoors for keeping living water animals and water plants. It is an idea of the present inventor to install an aquarium inside a vehicle by utilizing the batteries of a vehicle to constantly operate an air pump to pump air into the aquarium. By means of constantly turning on the power of a vehicle, a vehicle is easy to start in all conditions, and because of the installation of an aquarium inside a vehicle, a driver may have less tendency to speed.

SUMMARY OF THE INVENTION

The present invention provides a vehicle interior aquarium for mounting inside a vehicle, which comprises a water tank for containing water to keep living water animals and water plants. A heat insulating top cover is mounted on the top of the water tank to prevent the splashing of water out of the water tank and to keep warm air inside the water tank. A shock absorbing base is provided to support the water tank and eliminate any possible shock waves transmitted from the vehicle to the water tank. An external air pump which consumes dry battery power or the storage battery power of a vehicle is attached to pump air into the water tank to generate air bubbles through bubble tubes. Two handholds are bilaterally mounted on two vertical side walls of the water tank so that it can be conveniently removed from one place to another.

BRIEF DESCRIPTION OF THE DRAWINGS

FIG. 2 is a sectional view of the shock absorbing base thereof;

FIG. 3 is a perspective exploded view thereof;

FIG. 4 is a sectional view taken on line 4—4 of FIG. 3;

DETAILED DESCRIPTION OF THE PREFERRED EMBODIMENTS

Figure 1:
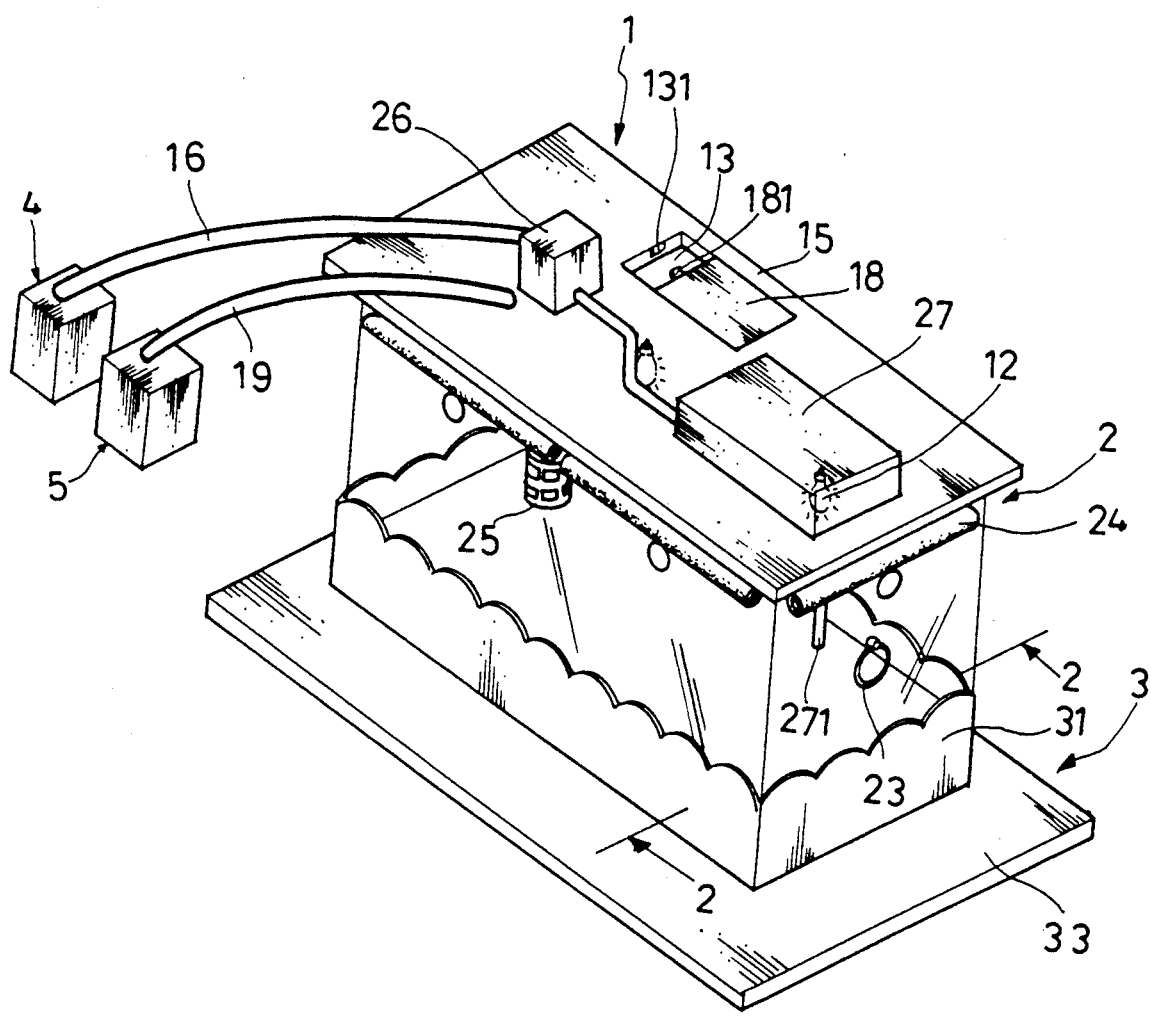
FIG. 1 is a perspective view of a vehicle interior aquarium embodying the present invention.

Referring to FIGS. 1 and 3, therein illustrated is a vehicle interior aquarium embodying the present invention and generally comprised of a water tank 2, a heat insulating top cover 1, a shock absorbing base 3, and an external dry battery-operated pump 4 or storage battery-operated pump 5. The heat insulating top cover 1 comprises a cover board 15 covered with a heat insulating paper and having a rectangular projection 14 vertically extending downward from its bottom surface, a plurality of round holes 11, 11' and a feed-hole 13 on its top surface. The feed-hole 13 has a retainer hole 131 thereon and is covered with a sliding door 18 which has a hooked bolt 181 to releasably fasten in the retainer hole 131 of the feed-hole 13. Inside the rectangular projection 14, there are mounted a plurality of color lamp bulbs 12 to produce light effect and generate heat. Referring to FIG. 4, a heat insulating element 16 is set in the middle inside the heat insulating top cover 1 to improve its heat insulating work. The heat insulating element 16 may be a polymeric foam or cooling mattress or any suitable heat insulating board.

As illustrated, the water tank 2 is a transparent, rectangular case having a rectangular hole 21 on the top and surrounded by a rectangular projection 211 which extends downward from the top face thereof and in which the rectangular projection 14 of the top cover 1 is fastened. Two bolt holes 22 are respectively made on two vertically opposite side walls of the water tank 2 in a middle position serving as drain holes, which are each fastened with a fastening ring 23 which comprises a bolt having a hoisting ring movably attached thereto for grasping by the hand of the user. Four pieces of auto-reverse sun screens 24 are attached to the front and the two opposite side walls of the water tank 2 by means of suction discs to protect against direct sunlight.

Referring to FIG. 2, the shock absorbing base 3 is comprised of a rectangular base board 33 for mounting inside a vehicle and a rectangular casing 31 for holding the water tank 2. The casing 31 is supported by four suspension springs 32 which are mounted on the base board 33 at the four corners thereof. The four side walls of the casing 31 extend downwardly but terminate short of contacting the top surface of the base board 33 so as to conceal the four suspension springs 32 from view. By means of the arrangement of the suspension springs 32, any possible shock waves which occur during driving of the vehicle can be greatly reduced from affecting the aquarium.

As illustrated in FIG. 1, two PVC hoses 16, 19 are inserted through two round holes 11, 11' on the top cover 1 and extend toward the bottom of the water tank 2 with one ends thereof respectively connected to two bubble tubes (not shown) inside the water tank, and with the other pair of ends externally respectively connected to a dry battery-operated pump 4 and a storage battery-operated pump 5. The dry battery-operated pump 4 is a conventional DC pump and the storage battery-operated pump 5 is an air pump operated by the storage battery of a vehicle. By means of the operation of the pumps 4, 5, air is pumped to the bubble tubes through the PVC hoses 16, 19, to generate air bubbles in the water inside the water tank 2 so as to provide the living water animals and water plants therein with fresh oxygen. The two pumps 4, 5 can, alternatively, be used together or only one of which may be selected for installation. When a storage battery-operated pump 5 is used to consume the battery of a vehicle, the cost for electric power consumption can be minimized and the vehicle will start more easily.

When the water inside the water tank 2 has to be changed, the two fastening rings 23 are removed from the water tank 2 permitting the inner water to drain out of the water tank 2. After the water inside the water tank 2 drops to a level below the bolt holes 22, the two fastening rings 23 are fastened in the two bolt holes 22 to stop water from passing therethrough. Fresh water is then added to the aquarium. When changing water, it is advisable not to drain the water inside an aquarium over its half volume since the water animals therein may be unable to adapt to a large change in fresh water. The two fastening rings 23 can serve as finger handholds so that the water tank and the top cover 1 can be removed from the shock absorbing base 3 and placed indoors.

Referring to FIG. 3, a water filter and circulation system may be attached to the water tank to filter the water supply. As illustrated, a wire gauze filter 25 is set inside the water tank 2 and connected with a water pipe 251 which extends upward through one of the round holes 11 on the top cover 1 to connect to an external water pump 26. The water pump 26 has an opposite end connected with filter 27 which has a water pipe 271 connected thereto and inserted inside the water tank 2 through one of the round holes 11' on the top cover. A rubber gasket 252 is mounted on the water pipe 251 to seal the gap between the round hole 11 and another rubber gasket 272 is mounted on the water pipe 271 to seal the gap between the round hole 11'. By means of the installation of the water filter and circulation system, clean water is circulated in the water tank 2, and it is not necessary to frequently change the water inside water tank 2.

Figure 5:
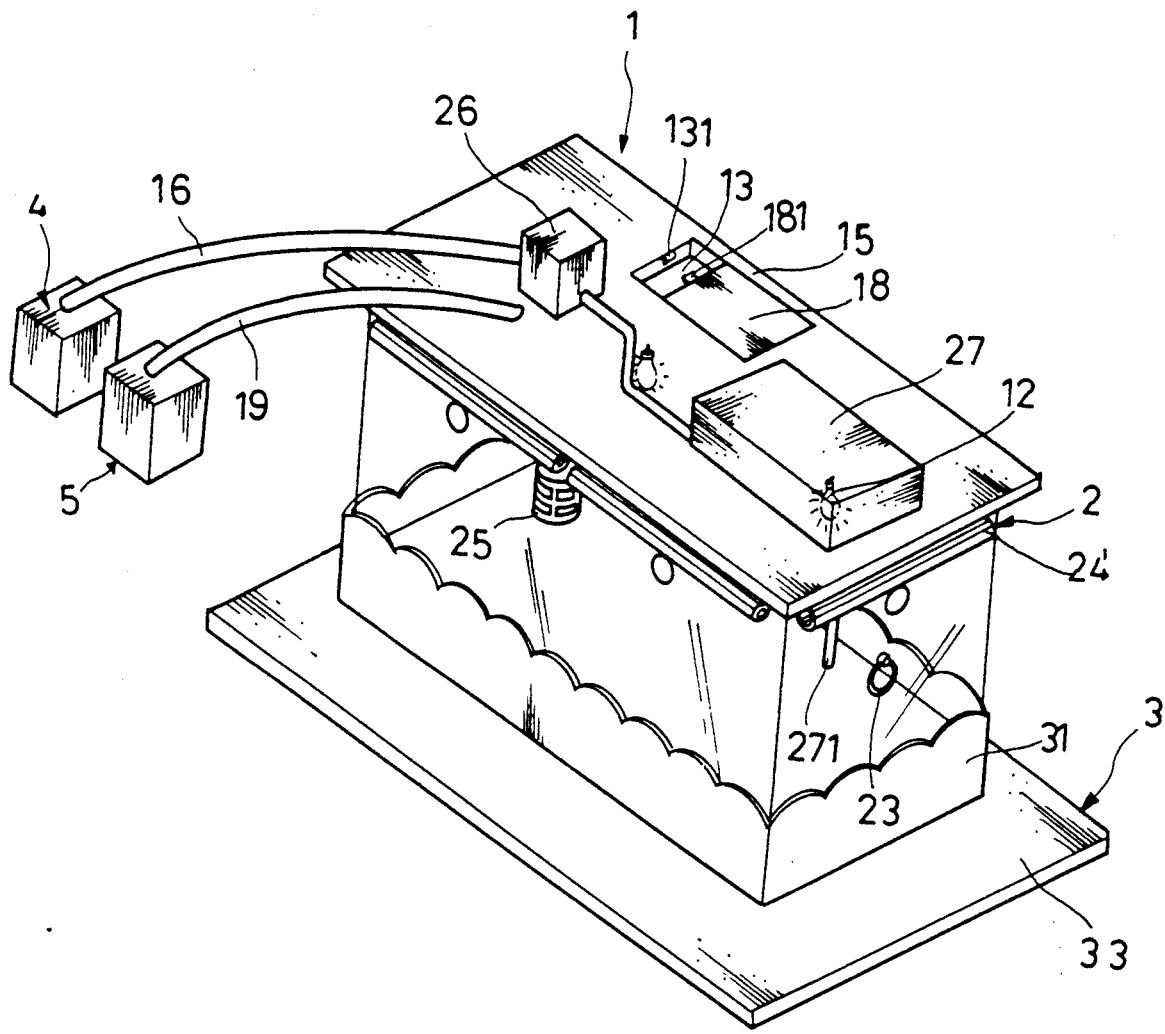
FIG. 5 is a perspective view of another embodiment of an aquarium according to the present invention.
Figure 6:
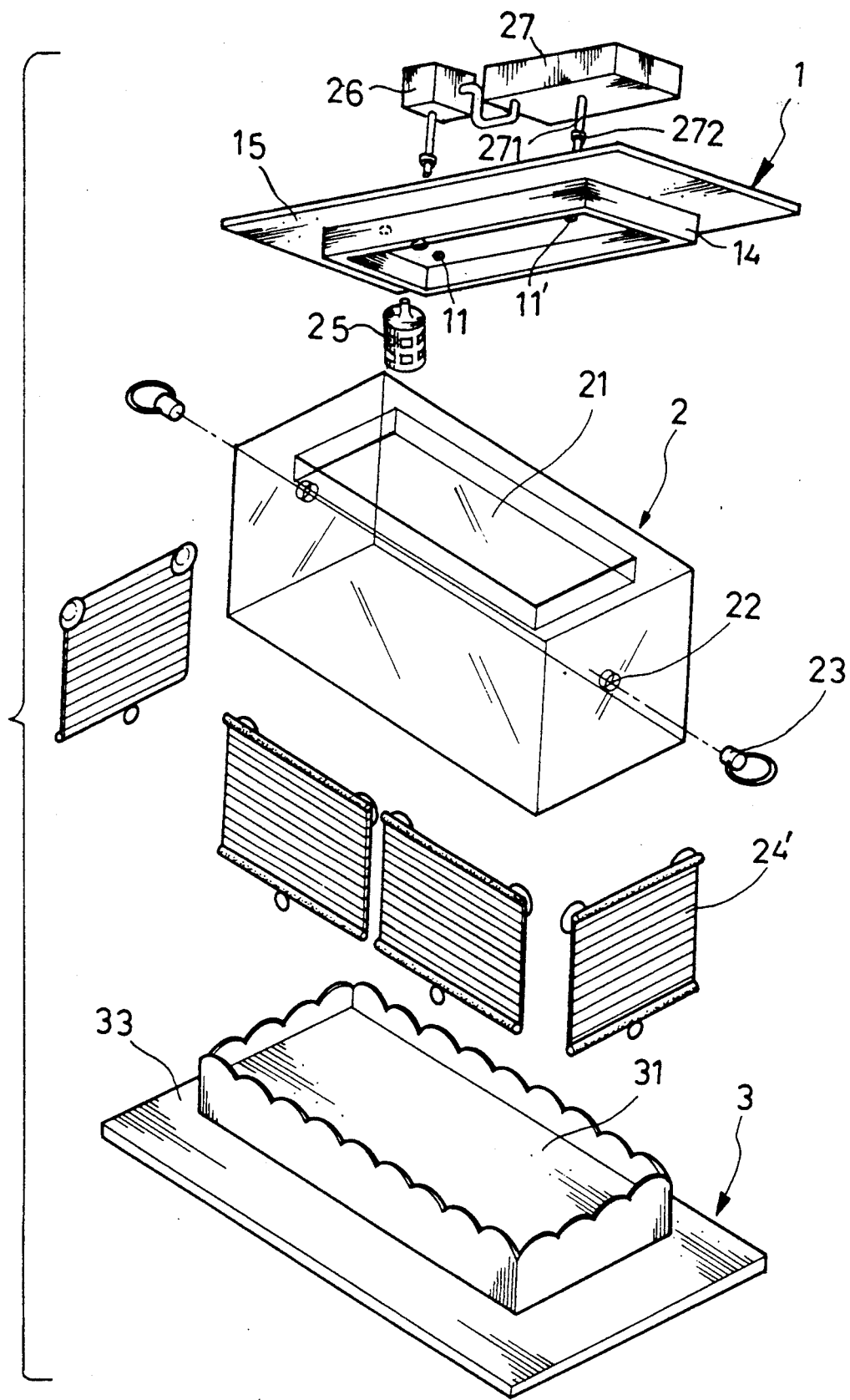
FIG. 6 is a perspective exploded view of the embodiment of FIG. 5.

Referring to FIGS. 5 and 6, therein illustrated is an alternate form of the present invention, in which four pieces of mini window blinds 24' are attached to protect against direct sunlight. The window blinds 24' are each comprised of a plurality of horizontal slats that can be automatically set together by spring means.

I claim:

1. A vehicle interior aquarium, comprising:
   a transparent water tank having an inner flange on the top defining therein an opening, two drain holes bilaterally on two opposite side walls of the tank in a middle position, each drain hole releasably sealed with a fastening ring, with each fastening ring including a movable ring secured to a bolt;
   a heat insulating top cover having a bottom flange inserted in said inner flange of said water tank, a feed-hole covered with a sliding door on the top of the cover, a plurality of color lamp bulbs fastened inside said bottom flange to produce light and heat;
   an air pump adapted to be connected to a dry battery of a vehicle to pump air into said water tank through a PVC hose, said PVC hose being inserted through said heat insulating top cover to the inside of said water tank;
   a plurality of suction discs, a plurality of auto-reverse sun screens respectively attached to a front and the two opposite side walls of said water tank by the suction discs to protect against direct sunlight into the water tank; and
   a shock absorbing base including a base board for mounting inside a vehicle, a casing for holding said water tank and a plurality of suspension springs set between the base board and the casing to eliminate shock waves into the water tank.

2. The vehicle interior aquarium of claim 1, wherein said heat insulating top cover includes an intermediate layer of heat insulating material.

* * * * *